US009665942B2

(12) United States Patent
Ma

(10) Patent No.: US 9,665,942 B2
(45) Date of Patent: May 30, 2017

(54) OBJECT DETECTION AND TRACKING SYSTEM

(71) Applicant: Sandia Corporation, Albuquerque, NM (US)

(72) Inventor: Tian J. Ma, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 222 days.

(21) Appl. No.: 14/662,705

(22) Filed: Mar. 19, 2015

(65) Prior Publication Data

US 2017/0061637 A1   Mar. 2, 2017

Related U.S. Application Data

(60) Provisional application No. 62/114,667, filed on Feb. 11, 2015.

(51) Int. Cl.
*G06T 7/00* (2017.01)
*G06T 5/00* (2006.01)

(52) U.S. Cl.
CPC ............ *G06T 7/0081* (2013.01); *G06T 5/002* (2013.01); *G06T 7/0004* (2013.01)

(58) Field of Classification Search
None
See application file for complete search history.

(56) References Cited

U.S. PATENT DOCUMENTS 5,960,097 A * 9/1999 Pfeiffer ................ G06K 9/3241
              342/357.59
8,103,161 B2   1/2012 Li
2003/0086608 A1 * 5/2003 Frost .................... G01N 15/147
              382/173
2004/0170308 A1 * 9/2004 Belykh .................... G06T 5/007
              382/128
2009/0066782 A1 * 3/2009 Choi ....................... H04N 3/155
              348/25
2009/0300692 A1 * 12/2009 Mavlankar ........ H04N 21/23431
              725/94
2014/0276104 A1 * 9/2014 Tao ....................... A61B 5/7239
              600/476

OTHER PUBLICATIONS

Grossi et al., "A Heuristic Algorithm for Track-Before-Detect With Thresholded Observations in Radar Systems," IEEE Signal Processing Letter, vol. 20, No. 8, Aug. 2013, pp. 811-814.

(Continued)

*Primary Examiner* — Tsung-Yin Tsai
(74) *Attorney, Agent, or Firm* — Medley, Behrens & Lewis LLC

(57) ABSTRACT

Methods and apparatuses for analyzing a sequence of images for an object are disclosed herein. In a general embodiment, the method identifies a region of interest in the sequence of images. The object is likely to move within the region of interest. The method divides the region of interest in the sequence of images into sections and calculates signal-to-noise ratios for a section in the sections. A signal-to-noise ratio for the section is calculated using the section in the image, a prior section in a prior image to the image, and a subsequent section in a subsequent image to the image. The signal-to-noise ratios are for potential velocities of the object in the section. The method also selects a velocity from the potential velocities for the object in the section using a potential velocity in the potential velocities having a highest signal-to-noise ratio in the signal-to-noise ratios.

20 Claims, 11 Drawing Sheets

(56) References Cited

OTHER PUBLICATIONS

Grossi et al., "A Novel Dynamic Programming Algorithm for Track-Before-Detect in Radar Systems," IEEE Transactions on Signal Processing, vol. 61, No. 10, May 2013, pp. 2608-2619.

Wu et al., "A novel Track-Before-Detect algorithm for small dim infrared target," IEEE International Conference on Multimedia and Signal Processing, vol. 1, May 2011, pp. 103-106.

Reed et al., "A Recursive Moving-Target-Indication Algorithm for Optical Image Sequences," IEEE Transactions on Aerospace and Electronic Systems, vol. 26, No. 3, May 1990, pp. 434-440.

Grossi et al., "A Track-Before-Detect Algorithm With Thresholded Observations and Closely-Spaced Targets," IEEE Signal Processing Letter, vol. 20, No. 12, Dec. 2013, pp. 1171-1174.

Yi et al., "An Efficient Multi-Frame Track-Before-Detect Algorithm for Multi-Target Tracking," IEEE Journal of Selected Topics in Signal Processing, vol. 7, No. 3, Jun. 2013, pp. 421-434.

Reed et al., "Application of Three-Dimensional Filtering to Moving Target Detection," IEEE Transactions on Aerospace and Electronic Systems, vol. AES-19, No. 6, Nov. 1983, pp. 898-905.

Simon et al., "Kalman Filtering with State Equality Constraints," IEEE Transactions on Aerospace and Electronic Systems, vol. 38, No. 1, Jan. 2002, pp. 128-136.

Chan et al., "Passive Sonar Detection and Localization by Matched Velocity Filtering," IEEE Journal of Oceanic Engineering, vol. 20, No. 3, Jul. 1995, pp. 179-189.

Buzzi et al., "Track-Before-Detect Procedures for Early Detection of Moving Target from Airborne Radars," IEEE Transactions on Aerospace and Electronic Systems, vol. 41, No. 3, Jul. 2005, pp. 937-954.

Buzzi et al., "Track-Before-Detect Procedures in a Multi-Target Environment," IEEE Transactions on Aerospace and Electronic Systems, vol. 44, No. 3, Jul. 2008, pp. 1135-1150.

Orlando et al., "Track-Before-Detect Strategies for STAP Radars," IEEE Transactions on Signal Processing, vol. 58, No. 2, Feb. 2010, pp. 933-938.

Badeau et al., "Fast Approximated Power Iteration Subspace Tracking," IEEE Transactions on Signal Processing, vol. 53, No. Aug. 2005, pp. 2931-2941.

* cited by examiner

OBJECT DETECTION AND TRACKING SYSTEM

RELATED PROVISIONAL APPLICATION

This application is related to and claims the benefit of priority of provisional U.S. Patent Application Ser. No. 62/114,667, filed Feb. 11, 2015, entitled "OBJECT DETECTION AND TRACKING SYSTEM", which is incorporated herein by reference.

STATEMENT OF GOVERNMENTAL INTEREST

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved object detection and tracking system, and in particular, to a method and apparatus for detecting and tracking objects using constrained velocity matched filters.

2. Background

Detecting and tracking objects in real world situations can be a challenging problem. For example, the sensor system may be located far enough away from an object such that the object is dim, making detecting the object more difficult. In particular, the object brightness may be below a desired threshold for the sensor system to detect the presence of the object. In this situation, a lower detection threshold may be used. This lower threshold, however, may result in a higher than desired rate of false alarms.

Additionally, the size of the object may be small enough such that the number of pixels detected for the object may increase the difficulty in identifying characteristics about the object. For example, identifying shape and texture information about the object may be more difficult with the number of pixels available.

With an inability to obtain characteristics about the object, filtering out false detections may be more difficult than desired. With this situation, automatically detecting objects in real-time that are barely visible to the human eye and with the object signal closer to the noise floor may make detecting objects more difficult than desired.

Velocity matched filters (VMFs) have been used to detect and track objects that have a low signal-to-noise ratio (SNR). These types of filters may be implemented in track before detect (TBD) systems.

A velocity matched filter applies a constraint that assumes an object will have a constant velocity over the integration period of the velocity matched filter. These types of filters may be applied to multiple images over time and detect objects having a signal-to-noise ratio that are otherwise undetectable with other detection techniques. When the velocity of the object is unknown, multiple velocity matched filters for different velocities are applied to identify the velocity of the object.

Although the use of velocity matched filters may be useful in tracking objects that have low signal-to-noise ratios, challenges are still present for using velocity matched filters in these systems. These challenges often occur when real-time surveillance is desired.

For example, the systems assume that the number of objects is known ahead of time. In real-time surveillance of an area, this type of information is often unavailable.

In some cases, this problem is solved by including a detection process before the track before detect process is used. However, using this additional detection process may be more challenging than desired when performing real-time surveillance of an area in which difficult to detect objects may be present.

Therefore, it would be desirable to have a method and apparatus that take into account at least some of the issues discussed above, as well as other possible issues. For example, it would be desirable to solve a technical problem with detecting objects in real-time with currently used detection processes that employ velocity matched filters.

SUMMARY

Methods and apparatuses for analyzing a sequence of images for an object are disclosed herein. In a general embodiment, the method identifies a region of interest in the sequence of images. The object is likely to move within the region of interest. The method divides the region of interest in the sequence of images into sections and calculates signal-to-noise ratios for a section in the sections. A signal-to-noise ratio for the section in the sections in an image in the sequence of images is calculated using the section in the image, a prior section in a prior image to the image in the sequence of images, and a subsequent section in a subsequent image to the image in the sequence of images. The signal-to-noise ratios are for potential velocities of the object in the section. The method selects a velocity from the potential velocities for the object in the section using a potential velocity in the potential velocities having a highest signal-to-noise ratio in the signal-to-noise ratios.

Another embodiment of the present disclosure provides an apparatus. The apparatus comprises an image analyzer that identifies a region of interest in a sequence of images. An object is likely to move within the region of interest. The image analyzer divides the region of interest in the sequence of images into sections and calculates signal-to-noise ratios for a section in the sections. A signal-to-noise ratio for the section in the sections in an image in the sequence of images is calculated using the section in the image, a prior section in a prior image to the image in the sequence of images, and a subsequent section in a subsequent image to the image in the sequence of images. The signal-to-noise ratios are for potential velocities of the object in the section. The image analyzer also selects a velocity from the potential velocities for the object in the section using a potential velocity in the potential velocities having a highest signal-to-noise ratio in the signal-to-noise ratios.

Yet another embodiment of the present disclosure provides a detection system. The detection system comprises a first detector that receives images that include a region of interest, a tracker in communication with the first detector, and a second detector in communication with the tracker. The first detector identifies detections for an object within sections of the region of interest using the images and calculates signal-to-noise ratios for a section in the sections. A signal-to-noise ratio for the section in the sections in an image in a sequence of images is calculated using the section in the image, a prior section in a prior image to the image in the sequence of images, and a subsequent section in a subsequent image to the image in the sequence of images. The signal-to-noise ratios are for potential velocities of the object in the section. The first detector also selects a velocity from the potential velocities for the object in the section using a potential velocity in the potential velocities having a highest signal-to-noise ratio in the signal-to-noise ratios. The velocity selected forms a detection in the detections. The tracker identifies a track for the object using the detections for the object. The second detector identifies additional detections for the object based on the track and the images.

The features and functions can be achieved independently in various embodiments of the present disclosure or may be combined in yet other embodiments in which further details can be seen with reference to the following description and drawings.

DETAILED DESCRIPTION

The illustrative embodiments recognize and take into account one or more different considerations. For example, the illustrative embodiments recognize and take into account that one challenge in a system that includes a detection process prior to a track before detect process is detecting an object without an undesired number of false alarms. For example, if the object is not detectable by a threshold set for the detection process, the detect process will not start. Setting the threshold to a higher level may result in an undesired number of false alarms.

The illustrative embodiments also recognize and take into account that currently available systems using velocity matched filters assume that the objects can be seen at all times. The illustrative embodiments recognize and take into account that in real world use, objects may not always be observable at all times by a sensor system. For example, a person may be observable by a sensor system until the person walks behind a tree or other object. In this situation, the hypotheses for the velocity matched filters in currently used systems are invalid.

Additionally, the illustrative embodiments recognize and take into account that currently used systems also are very resource intensive. For example, currently, systems that employ velocity matched filters perform an exhaustive search of all possible directions and velocities. Additionally, these systems also sum the frames for all of the hypotheses. The illustrative embodiments recognize and take into account that this type of processing may use more resources than desired.

Thus, the illustrative embodiments provide a method and apparatus for analyzing objects. For example, in one illustrative example, a method and apparatus analyze a sequence of images. In one illustrative example, a method is present for analyzing a sequence of images for an object. A region of interest in the sequence of images is identified in which the object is likely to move within the region of interest. The region of interest in the sequence of images is divided into sections. Signal-to-noise ratios are calculated for a section in the sections. The signal-to-noise ratio for a section in the sections in an image in the sequence of images is calculated using the section in the image, a prior section in a prior image to the image in the sequence of images, and a subsequent section in a subsequent image to the image in the sequence of images. The signal-to-noise ratios are for potential velocities of the object in the section. A velocity is selected from the potential velocities for the object in the section using the potential velocity in the potential velocities having a highest signal-to-noise ratio in the signal-to-noise ratios.

Figure 1:
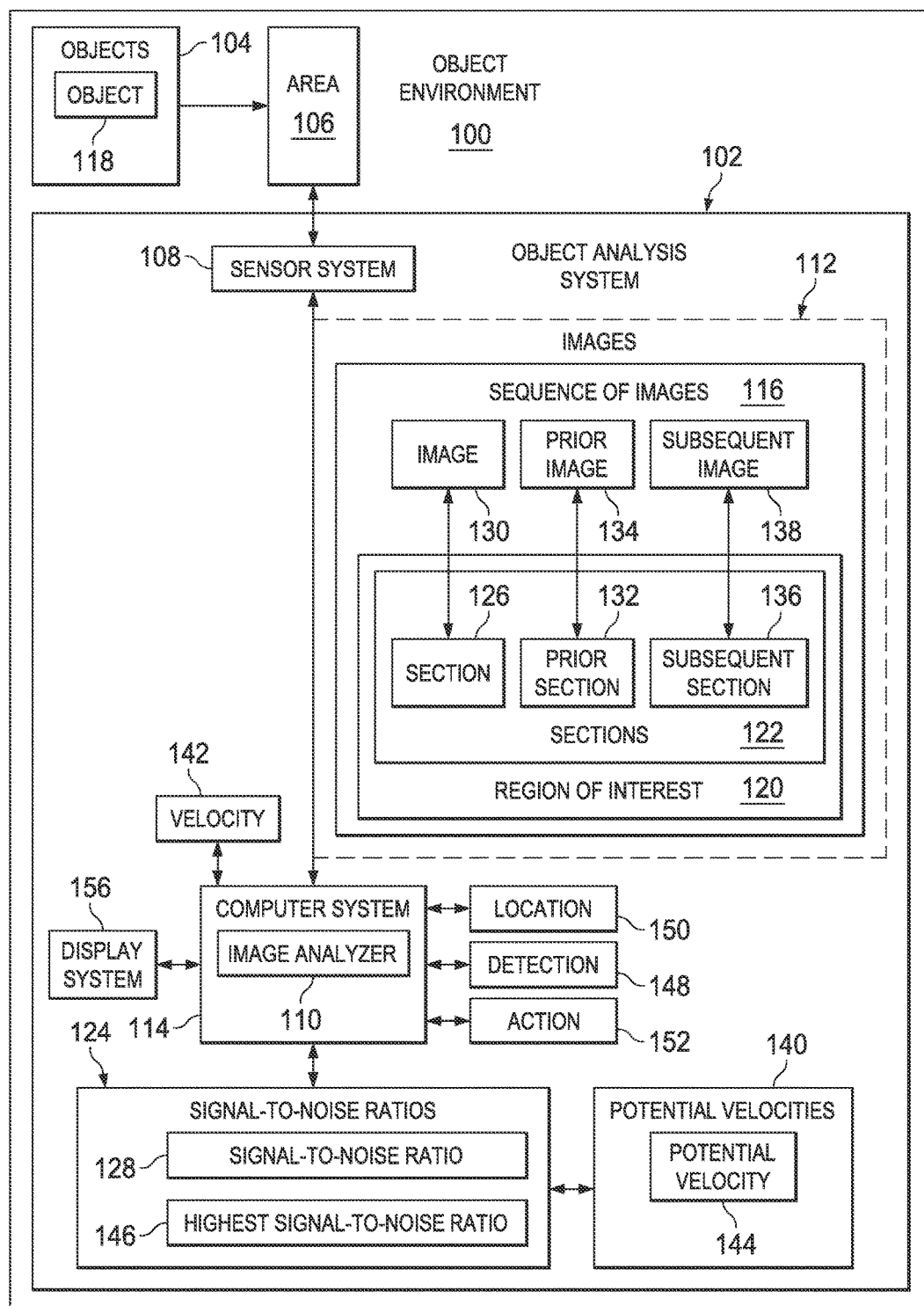
FIG. 1 is an illustration of a block diagram of an object environment in accordance with an illustrative embodiment.

With reference now to the figures, and in particular, with reference to FIG. 1, an illustration of a block diagram of an object analysis environment is depicted in accordance with an illustrative embodiment. In this illustrative example, object environment 100 includes object analysis system 102, which performs an analysis of objects 104 in object environment 100.

In this illustrative example, objects 104 may move in area 106 in object environment 100. Objects 104 are objects that move and may take various forms. For example, an object in objects 104 may be selected from one of a person, a car, a truck, an animal, an aircraft, a train, or some other suitable object. Area 106 may be, for example, selected from one of a park, a road, a city block, a meadow, a forest, a stadium, a yard, an atrium, a room, a river, a lake, a portion of the sky, or some other suitable area of interest in which analysis of objects 104 is desired.

As depicted, object analysis system 102 performs at least one of detection or tracking of objects 104 within area 106. For example, object analysis system 102 may perform at least one of detection and tracking of objects moving within area 106. As depicted, objects moving within area 106 may move into area 106, out of area 106, through area 106, or only inside area 106.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, object analysis system 102 includes a number of different components. As depicted, object analysis system 102 includes sensor system 108 and image analyzer 110. As used herein, a "number of items" is one or more items. For example, a number of portions is one or more portions.

Sensor system 108 is a hardware system and generates images 112 of area 106. Sensor system 108 may include at least one of a camera, a digital camera, a traffic camera, a video camera, an Internet protocol (IP) camera, a pan-tilt-zoom (PTZ) camera, a stereo camera, a visible light camera, a thermographic camera, or some other suitable type of device that generates images 112.

Images 112 are sequential in this particular example. Images 112 may be generated by sensor system 108 on a periodic basis. For example, images 112 may take the form of frames for a video of area 106. In other illustrative examples, images 112 may be still images generated over time.

A "frame" is an image in a video. For example, in a stream of video, a frame for the video is a group of pixels for an image for a particular point in time in the video.

Pixels are the smallest unique components of an image. Pixels have intensity for a type of radiation. The type of radiation is at least one of visible light, infrared light, or other suitable type of radiation. For example, when the type of radiation is visible light, the intensity may be values that describe a particular color for the pixel in the image.

In this example, these values for the particular color are at least one of a level of red, a level of blue, a level of green, a combination of levels of red, green, and blue, or other suitable combination of different levels of colors for different coloring systems. A level of a color is an amount of intensity for the color selected from a range of values.

As used herein, a "group of" items is one or more items. For example, a group of pixels is one or more pixels.

As depicted, sensor system 108 sends images 112 to image analyzer 110. In this illustrative example, image analyzer 110 detects objects 104 in area 106 using images 112. Image analyzer 110 may also track objects 104 using images 112.

Image analyzer 110 may be implemented in software, hardware, firmware or a combination thereof. When software is used, the operations performed by image analyzer 110 may be implemented in program code configured to run on hardware, such as a processor unit. When firmware is used, the operations performed by image analyzer 110 may be implemented in program code and data and stored in persistent memory to run on a processor unit. When hardware is employed, the hardware may include circuits that operate to perform the operations in image analyzer 110.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, image analyzer 110 may be implemented in computer system 114. As depicted, computer system 114 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

During operation in one illustrative example, image analyzer 110 receives images 112 from sensor system 108 as sequence of images 116. In one illustrative example, image analyzer 110 analyzes sequence of images 116 for object 118 in objects 104.

As depicted, image analyzer 110 identifies region of interest 120 in sequence of images 116. In this illustrative example, object 118 is likely to move within region of interest 120. For example, object 118 may move into region of interest 120, move out of region of interest 120, move through region of interest 120, or move entirely within region of interest 120.

In this illustrative example, image analyzer 110 divides region of interest 120 in sequence of images 116 into sections 122. As depicted, sections 122 may be referred to as chips. As used herein, chips are detection windows in images. These detection windows are locations where object 118 may be located.

Image analyzer 110 calculates signal-to-noise ratios 124 for section 126 in sections 122. Signal-to-noise ratio 128 in signal-to-noise ratios 124 for section 126 in sections 122 in image 130 in sequence of images 116 is calculated using section 126 in image 130, prior section 132 in prior image 134 to image 130 in sequence of images 116, and subsequent section 136 in subsequent image 138 to image 130 in sequence of images 116.

Signal-to-noise ratios 124 are for potential velocities 140 of object 118 in section 126. A potential velocity is a velocity at which object 118 may travel. Velocity 142 of object 118 may be one of potential velocities 140 in this illustrative example. A signal-to-noise ratio is the result of a comparison of a level of a desired signal to a level of background noise.

In the illustrative example, a velocity is a vector that includes both a magnitude and a direction. The scalar absolute value of velocity is speed in the illustrative examples.

As depicted, image analyzer 110 selects velocity 142 for object 118 in section 126 using potential velocity 144 in potential velocities 140 having highest signal-to-noise ratio 146 in signal-to-noise ratios 124.

With this information, image analyzer 110 generates detection 148. In this example, detection 148 may include information such as velocity 142 and location 150 of object 118. As depicted, location 150 may be the location of object 118 in image 130. In another illustrative example, location 150 may be the location of object 118 in area 106.

With detection 148, image analyzer 110 may perform action 152. In this illustrative example, action 152 may be selected from one of generating an alert, generating a warning, sending a message, displaying an indicator on display system 156, displaying image 130 with an indicator identifying location 150 of object 118 in image 130, identifying object 118, identifying a track for object 118, or other suitable actions.

In another illustrative example, action 152 may be performed by an operator. For example, a human operator may send instructions to intercept object 118, perform further surveillance of object 118, send instructions to ground forces, or other suitable actions.

As a result, computer system 114 operates as a special purpose computer system in which image analyzer 110 in computer system 114 enables detecting objects 104 that may be in area 106 using images 112 more quickly than with currently used techniques that employ velocity matched filters. For example, image analyzer 110 in computer system 114 may allow for real-time or near real-time detection of objects 104 using images 112, solving the technical problem of detecting objects in real-time with currently used detection processes that employ velocity matched filters.

In particular, image analyzer 110 transforms computer system 114 into a special purpose computer system as compared to currently available general computer systems that do not have image analyzer 110. For example, image analyzer 110 in computer system 114 may allow for real-time or near real-time detection of objects 104 using images 112. This type of detection also may be performed using fewer processor resources than with currently used systems.

Figure 2:
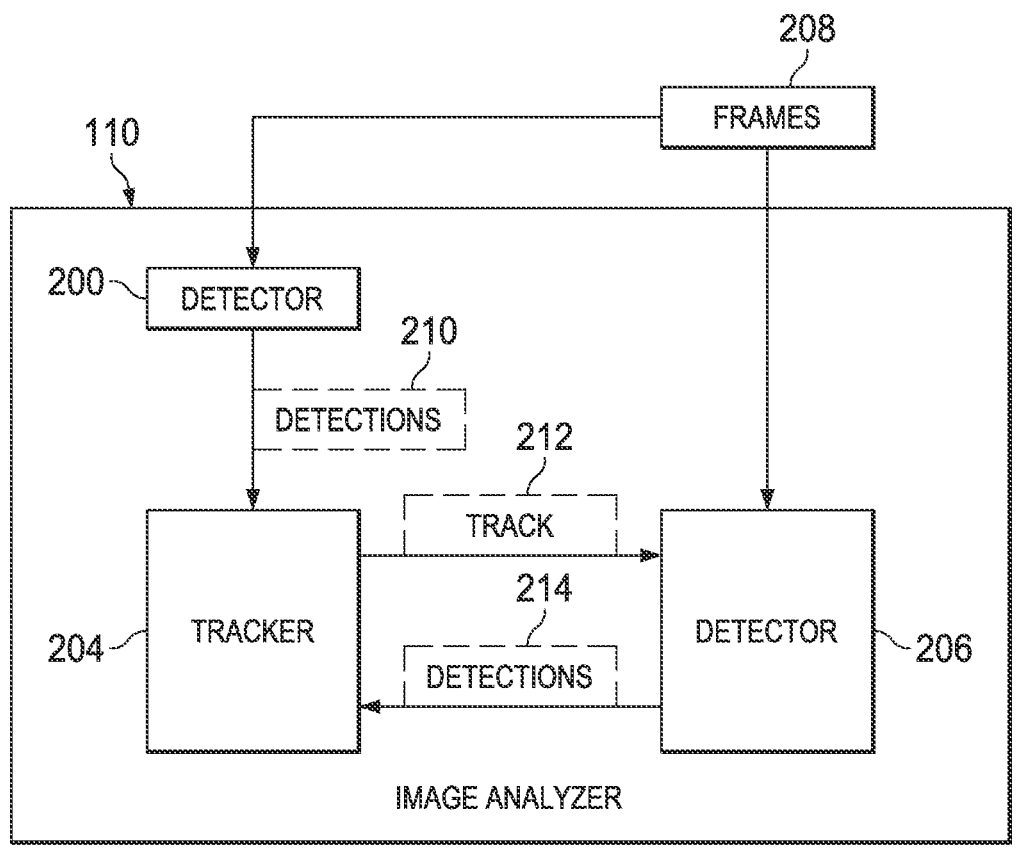
FIG. 2 is an illustration of a block diagram of an image analyzer in accordance with an illustrative embodiment.

With reference now to FIG. 2, an illustration of a block diagram of an image analyzer is depicted in accordance with an illustrative embodiment. As depicted, examples of components that may be used to implement image analyzer 110 are shown.

In this illustrative example, image analyzer 110 has a number of different components. As depicted, image analyzer 110 includes detector 200, tracker 204, and detector 206. Detector 200 is a first detector in image analyzer 110, and detector 206 is a second detector in image analyzer 110.

As depicted in this illustrative example, frames 208 are received by detector 200 in image analyzer 110. Frames 208 are an example of sequence of images 116 in FIG. 1. As depicted, frames 208 are generated by sensor system 108 in FIG. 1.

Detector 200 processes frames 208 and detects objects 104 in FIG. 1. For example, detector 200 identifies object 118 in area 106 in FIG. 1 from processing frames 208.

In this illustrative example, detector 200 generates detections 210 for object 118 in frames 208. Detections 210 are examples of detection 148 in FIG. 1. As depicted, detections 210 are sent to tracker 204.

Tracker 204 generates track 212 for object 118 from detections 210. In this illustrative example, track 212 for object 118 is a sequence of detections of object 118. The sequence is an order based on time in this example.

The detections in the sequence of detections may be state vectors. These state vectors may be used to predict where the location would be in the next time.

For example, the location and the velocity of object 118 in detections 210 may be used to generate track 212. Tracker 204 may use a group of detections of object 118 in detections 210 to identify track 212 for object 118.

Additionally, tracker 204 also may identify an amount of confidence for track 212. The amount of confidence for track 212 is the likelihood that track 212 is the correct track for object 118. Tracker 204 may identify the amount of confidence for track 212 based on the likelihood that each detection in the group of detections is correct. Tracker 204 identifies this likelihood based on at least one of an amount of deviation from an expected shape of object 118, an amount of deviation from expected velocities for object 118 over time, or an amount of deviation from a path where object 118 is expected to be traveling.

For example, if object 118 is a car, tracker 204 may calculate this likelihood based on an amount of difference between a shape of an object in detections in track 212 and the shape of the car. As another example, when the expected velocities for object 118 are known, tracker 204 may calculate this likelihood based on an amount of difference between the velocities of the detections in track 212 and the expected velocities. In still another illustrative example, when the expected path for object 118 is known, tracker 204 may calculate this likelihood based on an amount of difference between track 212 and the expected path.

As depicted, tracker 204 sends track 212 to detector 206. For example, tracker 204 may send track 212 when the amount of confidence for track 212 meets a desired amount of confidence for track 212. The desired amount of confidence may be set at different amounts depending on the particular implementation. Factors used to set the desired amount of confidence include at least one of a desire to modify an amount of resource use, a desire to reduce false positive identifications of tracks, a desire to improve the tracks that meet or exceed the desired confidence level, or some other suitable factors.

Detector 206 processes frames 208 to detect object 118. For example, detector 206 may process frames 208 to identify object 118 on track 212 in area 106. In this illustrative example, detector 206 generates detections 214 for object 118 in frames 208 on track 212. Detections 214 are additional detections. Detector 206 sends detections 214 to tracker 204.

In this illustrative example, tracker 204 updates track 212 for object 118 using detections 214. Track 212 may be updated through at least one of changing detections in track 212 or validating detections in track 212 in the illustrative example. For example, the location and the velocity of object 118 in detections 214 may be used to perform at least one of changing detections of object 118 in track 212 or validating detections of object 118 in track 212.

Tracker 204 validates detections in track 212. The validation may be performed by comparing the detections in track 212 to detections 214 to form a comparison. Tracker 204 then uses the comparison to identify whether the detections in track 212 are correct.

In the illustrative example, tracker 204 changes the amount of confidence for track 212 based on likelihood that each detection in detections 214 is correct. For example, the amount of confidence for track 212 may be improved when tracker 204 uses detections 214 to update track 212.

Figure 3:
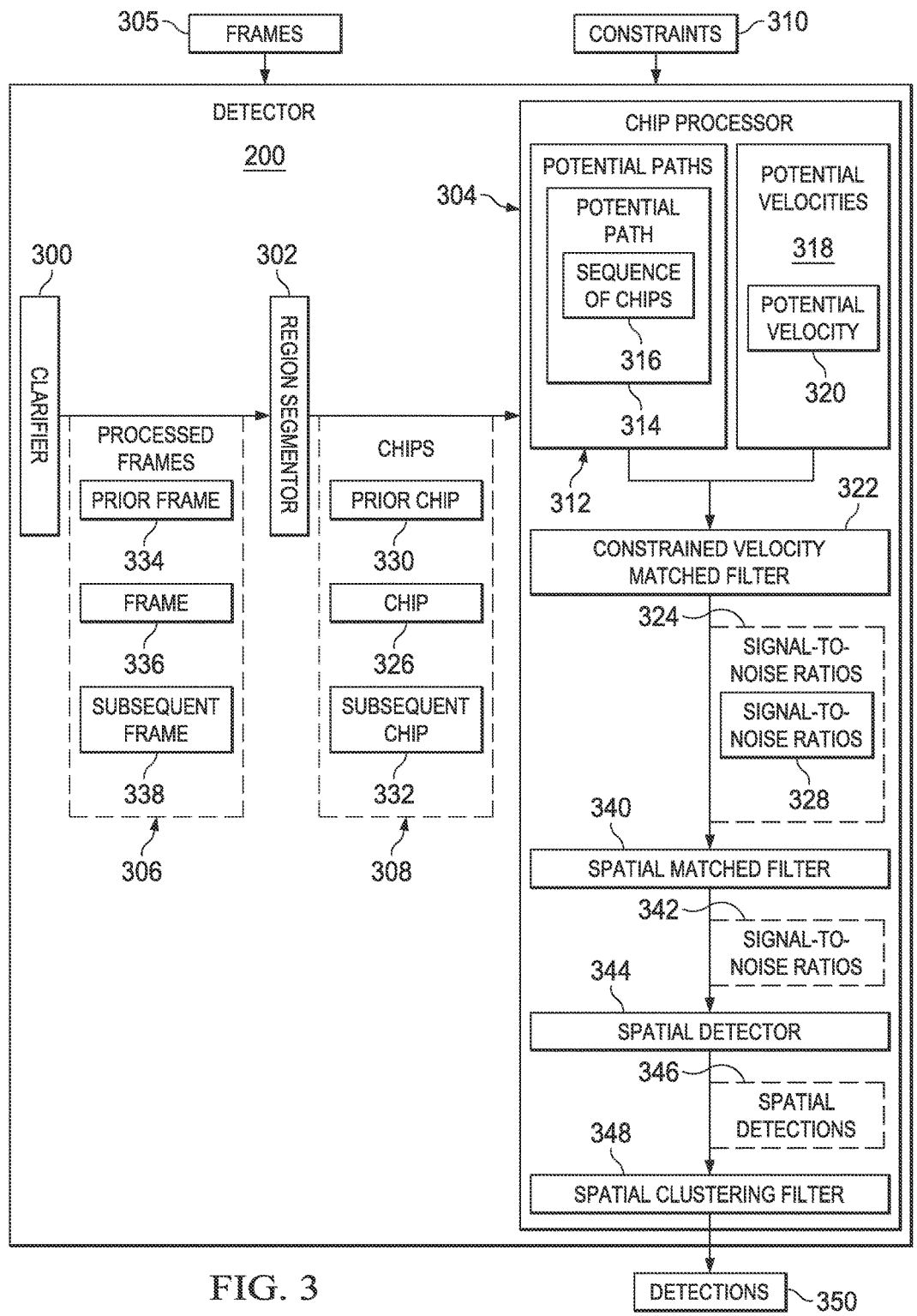
FIG. 3 is an illustration of a block diagram of a detector in accordance with an illustrative embodiment.

With reference next to FIG. 3, an illustration of a block diagram of a detector is depicted in accordance with an illustrative embodiment. An example of components that may be used to implement detector 200 is shown in this figure.

In this illustrative example, detector 200 includes a number of different components. As depicted, detector 200 includes clarifier 300, region segmentor 302, and chip processor 304.

As depicted, clarifier 300 processes frames 305 to generate processed frames 306. Frames 305 are an example of sequence of images 116 in FIG. 1.

In this illustrative example, clarifier 300 generates processed frames 306 from frames 305 using image processing techniques that improve an ability to identify objects traveling within region of interest 120 in FIG. 1. For example, the image processing techniques include at least one of background suppression, whitening, spatial matched filtering, or other suitable types of image processing.

In the illustrative example, region segmentor 302 divides a region of interest in processed frames 306 into chips 308. Chips 308 are examples of sections 122 in FIG. 1. Chips 308 may be for all of the region of interest or a portion of the region of interest.

In this illustrative example, region segmentor 302 divides the region of interest into chips 308 using constraints 310. As depicted, constraints 310 are information about the region of interest. This information identifies at least one of a path where an object may be traveling within region of interest, velocities for objects traveling in the region of interest, a path and velocities, or other suitable types of constraints for dividing the region of interest in processed frames 306 into chips 308. The region of interest may be referred to as a constrained region.

Chip processor 304 identifies potential paths 312 for object 118 from constraints 310. Potential path 314 is an example of a path in constraints 310 where object 118 may travel within region of interest 120. As depicted, potential path 314 includes sequence of chips 316. In this illustrative example, chip processor 304 identifies sequence of chips 316 on potential path 314.

As depicted, chip processor 304 also identifies potential velocities 318 for object 118 for potential paths 312. Potential velocity 320 is an example of a velocity that may be present for object 118 on potential path 314. Chip processor 304 identifies potential velocities 318 from constraints 310.

Constrained velocity matched filter 322 in chip processor 304 calculates signal-to-noise ratios 324. Constrained velocity matched filter 322 calculates signal-to-noise ratios 324 for each potential velocity for each chip in each sequence of chips on each potential path. In this illustrative example, a constrained velocity matched filter is a velocity matched filter with an additional constraint that assumes the object will travel on a particular path.

As depicted, chip 326 in chips 308 is an example of a chip in sequence of chips 316. In this illustrated example, signal-to-noise ratios 328 are an example of signal-to-noise ratios 324 for chip 326. Constrained velocity matched filter 322 identifies signal-to-noise ratios 328 using potential velocity 320 and potential path 314.

In this illustrative example, chip 326 is located on potential path 314 at a location on potential path 314 where object 118 may be identified. Constrained velocity matched filter 322 identifies a prior location on potential path 314 using the location where chip 326 is located on potential path 314 and potential velocity 320. Constrained velocity matched filter 322 identifies prior chip 330 as the chip that is at the prior location.

Similarly, constrained velocity matched filter 322 identifies a subsequent location on potential path 314 using the location where chip 326 is located on potential path 314 and potential velocity 320. Constrained velocity matched filter 322 identifies subsequent chip 332 as the chip that is at the subsequent location.

Thus, constrained velocity matched filter 322 identifies how object 118 will "shift" from one location on potential path 314 to another location on potential path 314 over time. The amount of distance along potential path 314 between a first location at a first time to a second location at a second time is an amount of shift for object 118 on potential path 314. For example, the amount of shift from time t to time t+1 second is the amount of distance on potential path 314 that object 118 travels in one second.

In other words, constrained velocity matched filter 322 identifies prior chip 330 and subsequent chip 332 based on the amount of distance object 118 is predicted to shift on potential path 314 over time. The identification of prior chip 330 based on the amount of distance object 118 is predicted to shift on potential path 314 over time may be referred to as identifying a prior section in a prior image based on a prediction of where object 118 would be at a prior time. Similarly, the identification of subsequent chip 332 based on the amount of distance object 118 is predicted to shift on potential path 314 over time may be referred to as identifying a subsequent section in a subsequent image based on a prediction of where object 118 would be at a subsequent time.

In this illustrative example, constrained velocity matched filter 322 identifies prior frame 334 for prior chip 330, frame 336 for chip 326, and subsequent frame 338 for subsequent chip 332. Frame 336 in processed frames 306 is a frame that has not been processed by chip processor 304.

In this example, constrained velocity matched filter 322 identifies prior frame 334 based on an amount of time object 118 takes to travel between prior chip 330 and chip 326 at potential velocity 320 on potential path 314. Constrained velocity matched filter 322 identifies subsequent frame 338 based on an amount of time object 118 takes to travel between chip 326 and subsequent chip 332 at potential velocity 320 on potential path 314.

Constrained velocity matched filter 322 identifies signal-to-noise ratios 328 for chip 326 as the average of pixels within prior chip 330 in prior frame 334, pixels within chip 326 in frame 336, and pixels within subsequent chip 332 in subsequent frame 338. For example, the average of the pixels is an average of the values of the pixels in this example.

The average value of a pixel for frames being summed is the sum of the values for the pixel in each of the frames being summed divided by the number of frames being summed. The sum of the values for the pixels in each of the frames may be referred to as a summed section. The average values of the pixels in the summed section may be referred to as an average of values of the summed section.

As depicted, spatial matched filter 340 in chip processor 304 processes signal-to-noise ratios 324. Spatial matched filter 340 maximizes signal-to-noise ratios 324 for chip 326. Spatial matched filter 340 calculates signal-to-noise ratios 342 using the following equation:

$$Z_f[n] = \sum_{k=1}^{K} h[n-k]\hat{Z}[k] \qquad (1)$$

where $\hat{Z}[k]$ is signal-to-noise ratios 324, $Z_f[n]$ is signal-to-noise ratios 342, K is the number of pixels in chip 326, and h is a matched filter for object 118.

The matched filter for object 118 is a linear filter. A linear filter is a component that removes noise from a sequence of images. In this illustrative example, the linear filter for the matched filter for object 118 removes noise in processed frames 306. Removing noise in processed frames 306 improves the likelihood that signal-to-noise ratios 342 indicate a presence of object 118.

In the illustrative example, spatial matched filter 340 maximizes signal-to-noise ratios 324 in the presence of noise in pixels within chips on processed frames 306. Maximizing signal-to-noise ratios 324 is changing a portion of signal-to-noise ratios 324 for object 118 to make the portion more prominent than the noise.

Spatial detector 344 in chip processor 304 receives signal-to-noise ratios 342 from spatial matched filter 340. In this illustrative example, spatial detector 344 generates spatial detections 346 from signal-to-noise ratios 342 using confidence interval testing. A spatial detection is a value that indicates whether a signal-to-noise ratio for a pixel meets a threshold for detecting an object.

This confidence interval testing calculates a spatial mean on signal-to-noise ratios 342 for a group of pixels within chips 308 for processed frames 306 that do not exceed a desired level for signal-to-noise ratios. This spatial mean is calculated using the following equation:

$$\mu_Z = \frac{1}{K} \sum_{k=1}^{K} Z_f(k), \; Z_f(k) \leq T1 \qquad (2)$$

where $\mu_z$ is the spatial mean, $Z_f(k)$ is signal-to-noise ratios for a group of pixels within a chip for a processed frame, T1 is a desired level for signal-to-noise ratios, and k is a variable identifying the chip.

This confidence interval testing also calculates a spatial standard deviation on signal-to-noise ratios 342. This spatial standard deviation is calculated using the following equation:

$$\sigma_Z = \sqrt{\frac{1}{K} \sum_{k=1}^{K} (Z_f(k) - \mu_z)^2}, \; Z_f(k) \leq T1 \qquad (3)$$

where $\sigma_z$ is the spatial standard deviation.

This confidence interval testing further calculates a Z score for $Z_f(k)$. The Z score is a value indicating how far a signal-to-noise ratio of a pixel deviates from the mean. This Z score is calculated as follows:

$$Z_s(i, j) = \frac{z_f(i, j) - \mu_z}{\sigma_z} \qquad (4)$$

where $Z_s$ is the Z score, and (i,j) are variables that reference signal-to-noise ratios 342 for the pixels in the group of pixels within chips 308 for processed frames 306.

This confidence interval testing further identifies spatial detections 346 for signal-to-noise ratios 342. Spatial detector 344 identifies spatial detections 346 based on the Z scores for the signal-to-noise ratios 342.

In the illustrative example, spatial detector 344 sets a portion of spatial detections 346 that have Z scores meeting a threshold to a value that indicates the threshold has been met. Spatial detector 344 sets the remaining portion of spatial detections 346 that do not have Z scores meeting the threshold to another value that indicates the threshold has not been met. In this illustrative example, the value that indicates the threshold has been met is one (1) and the value that indicates the threshold has not been met is zero (0).

Spatial clustering filter 348 in chip processor 304 receives spatial detections 346 from spatial detector 344. In this illustrative example, spatial clustering filter 348 generates detections 350 from spatial detections 346 using clustering.

This clustering is a process for detecting objects within chips 308 for processed frames 306. Clustering involves identifying clusters of spatial detections 346. A cluster is a group of connected spatial detections in spatial detections 346 that have a value of 1. Two spatial detections are connected when the two spatial detections are next to each other. Spatial clustering filter 348 identifies compactness for each cluster using the following equation:

$$\text{compactness} = \frac{\textit{Num} \text{ Pixels in Cluster}}{\text{Area of Cluster}} \qquad (5)$$

Spatial clustering filter 348 filters the identified clusters based on the compactness of each identified cluster.

For example, if the compactness for object 118 is known, spatial clustering filter 348 may filter a portion of the identified clusters that do not have a compactness within a desired range of the known compactness for object 118. The desired range may be set to different ranges depending on the particular implementation. Factors used to set the desired range of the known compactness for object 118 include at least one of a desire to modify an amount of resource use, a desire to reduce false positive identifications of tracks, or a desire to improve the tracks. Spatial clustering filter 348 then generates detections 350 for the identified clusters.

In this illustrative example, detections 350 may be ordered based on at least one of compactness of the cluster or average Z score for the pixels in the cluster. Ordering detections 350 enables selection of a desired portion of detections 350.

As depicted, chip processor 304 may use a processor unit to perform the processing for the components of chip processor 304. Chip processor 304 also may use processor units to perform the processing for the components of chip processor 304. When processor units are used, the components of chip processor 304 perform processing in parallel.

For example, the processor units may be used to calculate groups of signal-to-noise ratios in signal-to-noise ratios 324. In this example, a group of signal-to-noise ratios is the signal-to-noise ratios within a chip for a processed frame for a potential velocity for a potential path.

Figure 4:
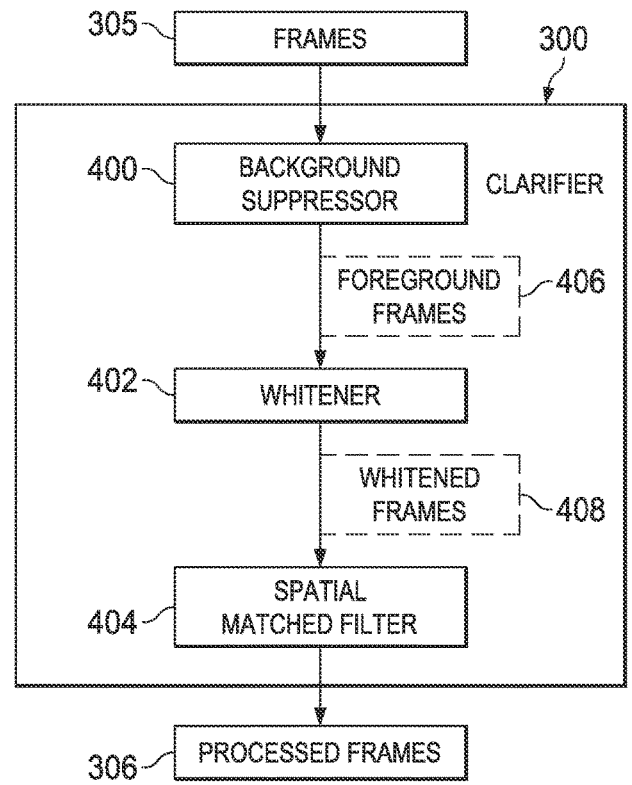
FIG. 4 is an illustration of a block diagram of a clarifier in accordance with an illustrative embodiment.

With reference next to FIG. 4, an illustration of a block diagram of a clarifier is depicted in accordance with an illustrative embodiment. In this figure, an example of components that may be used to implement clarifier 300 in FIG. 3 are shown. In this particular example, clarifier 300 includes background suppressor 400, whitener 402, and spatial matched filter 404.

As depicted, background suppressor 400 processes frames 305. Background suppressor 400 generates foreground frames 406 based on frames 305. Foreground frames 406 are frames that have unwanted background features removed.

Background suppressor 400 generates foreground frames 406 by removing portions of frames 305 that are not of interest from foreground frames 406. These portions of frames 305 may be referred to as a number of portions of sequences of images that form the background in the sequence of images.

Portions of frames 305 that may not be of interest include objects or portions of frames 305 that do not change. Additionally, some objects that move may not be of interest.

For example, objects not moving within a range of velocities may also be removed. For example, objects on a frame that move slower or faster than a desired range of speeds may be removed. Additionally, an object moving in directions other than desired directions may be removed.

As depicted, whitener 402 receives foreground frames 406 from background suppressor 400. Whitener 402 may be used to reduce pixel variation over time for each pixel in foreground frames 406. This reduction in pixel variation results in reducing the noise in foreground frames 406. This reduction in pixel variation on foreground frames 406 may be referred to as reducing variations in the pixels in a sequence of images. Whitener 402 generates whitened frames 408. In this illustrative example, a whitened frame is a frame that only has black pixels and white pixels.

Whitener 402 generates whitened frames 408 using the following equation:

$$Z_{SPATIAL}(k, h; t) = \frac{X(k, h; t) - B(k, h; t)}{\sigma_{SPATIAL}(k, h; t)},$$

$$Z_{TEMPORAL}(k, h; t) = \frac{X(k, h; t) - B(k, h; t)}{\sigma_{TEMPORAL}(k, h; t)},$$

$$Z_{HYBRID}(k, h; t) = \frac{X(k, h; t) - B(k, h; t)}{\sigma_{MAX}(k, h; t)},$$

$$\sigma_{MAX}(k, h; t) = \max\{\sigma_{SPATIAL}(k, h; t), \sigma_{TEMPORAL}(k, h; t)\}$$

(6)

where $Z_{SPATIAL}$ is the frame used to reduce false alarms in high contrast areas of foreground frames 406, $Z_{TEMPORAL}$ is the frame used to detect changes in foreground frames 406 over time, $Z_{HYBRID}$ is the frame used to detect changes in foreground frames 406 while reducing false alarms in high contrast areas in the presence of jitter in foreground frames 406, k,h are pixels in a frame, X is a frame at time t, B is an estimated background at time t for a frame at time t, $\sigma_{SPATIAL}$(k,h;t) are spatial error estimates of pixels k,h; $\sigma_{TEMPORAL}$(k,h;t) are temporal error estimates of pixels k,h, and $\sigma G_{MAX}$(k,h;t) are hybrid estimates of pixels k,h.

Jitter is an unwanted change in frames caused by limitations of sensor system 108. These limitations are at least one of an unsteadiness of sensor system 108, an atmospheric condition, or any other suitable types of limitations of sensor system 108.

A spatial error estimate in equation (6) for pixels in a frame is an expected amount of deviation in the pixels over time. A temporal error estimate is the error between a frame at time t and the background at time t. A hybrid estimate uses both the spatial error estimate and the temporal error estimate to reduce pixel variation over time. Whitener 402 generates whitened frames 408 using these hybrid estimates to reduce pixel variation in foreground frames 406.

In this illustrative example, spatial matched filter 404 receives whitened frames 408 from whitener 402. As depicted, spatial matched filter 404 processes whitened frames 408 to remove noise in whitened frames 408. Spatial matched filter 404 generates processed frames 306 using the following equation:

$$Z[n]=\Sigma_{k=1}^{K}h[n-k]Z_{HYBRID}[k]$$ (7)

where h is a matched filter for object 118.

Processed frames 306 have improved signal-to-noise ratios over whitened frames 408. This improvement is based on removal of noise in whitened frames 408.

Figure 5:
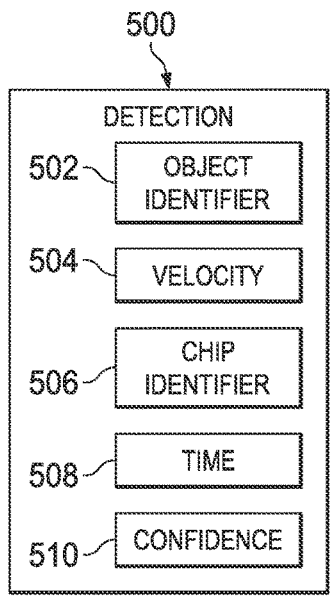
FIG. 5 is an illustration of a block diagram of a detection in accordance with an illustrative embodiment.

Turning next to FIG. 5, an illustration of a block diagram of a detection is depicted in accordance with an illustrative embodiment. In this illustrative example, detection 500 is an example of a detection in detections 210 and detections 214 in FIG. 2.

In this illustrative example, detection 500 is a data structure that includes a number of different types of information. In this example, detection 500 is generated to indicate a detection of object 118 in FIG. 1. As depicted, detection 500 includes object identifier 502, velocity 504, chip identifier 506, time 508, and confidence 510.

Object identifier 502 is an identification of an object that has been detected. Object identifier 502 points to an object in objects 104 in FIG. 1. Object identifier 502 may be, for example, a unique identifier, a number, a name, an alphanumeric string, or some other suitable type of identifier. For example, object identifier 502 may be an alphanumeric string that identifies object 118.

As depicted, velocity 504 is a vector. Velocity 504 for detection 500 includes the speed and direction of the object identified by object identifier 502.

In this illustrative example, chip identifier 506 identifies the chip for which detection 500 is generated. For example, chip identifier 506 may be an identification of chip 326 in FIG. 3.

Time 508 indicates when the object moved at velocity 504 at a location along a path in a region of interest for which detection 500 was generated. For example, time 508 may be the time when object 118 in FIG. 1 was located within chip 326 on frame 336. In this example, time 508 is the time when frame 336 was generated by a sensor system.

As depicted, confidence 510 is the likelihood that the detection of an object is correct. For example, confidence 510 may be the likelihood that the detection of object 118 in FIG. 1 at potential velocity 320 within chip 326 on frame 336 is correct.

Figure 6:
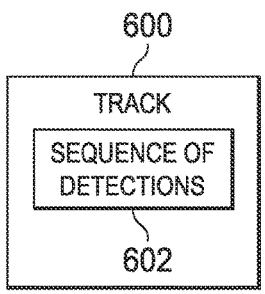
FIG. 6 is an illustration of a block diagram of a track in accordance with an illustrative embodiment.

With reference to FIG. 6, an illustration of a block diagram of a track is depicted in accordance with an illustrative embodiment. Track 600 is an example of track 212 in FIG. 2. In this illustrative example, track 600 is a data structure that includes sequence of detections 602. Sequence of detections 602 defines a path for an object.

Figure 7:
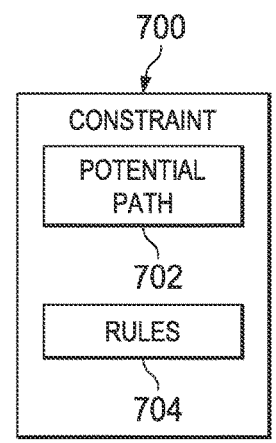
FIG. 7 is an illustration of a block diagram of a constraint in accordance with an illustrative embodiment.

In FIG. 7, an illustration of a block diagram of a constraint is depicted in accordance with an illustrative embodiment. As depicted, constraint 700 is an example of a constraint in constraints 310 in FIG. 3. In this example, constraint 700 is a data structure containing potential path 702 and a group of rules 704.

Potential path 702 is a path on which objects may travel. Potential path 702 is at least one of a road, a walkway, a trail, a water way, a route, or other suitable type of path for objects. For example, potential path 702 may be a path on which objects move from one location on the path to another location on the path.

In this illustrative example, the group of rules 704 is rules for objects traveling within potential path 702. The group of rules 704 includes at least one of a rule specifying direction of travel, a rule specifying a range of velocities, a rule specifying a time of day when constraint 700 applies, or other suitable types of rules for objects traveling on potential path 702.

The illustration of object environment 100 and the different components in FIGS. 1-7 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, image analyzer 110 has been described as analyzing sequence of images 116 for object 118 in objects 104. Image analyzer 110 may also analyze sequence of images 116 for other objects in objects 104 in addition to or in place of object 118.

As yet another illustrative example, image analyzer 110 may also perform other operations in addition to detecting objects. For example, image analyzer 110 may perform one of tracking objects 104 or identifying objects 104 in addition to or in place of detecting objects 104.

As another illustrative example, detection 500 may include velocity 504 and a location of the object and omit object identifier 502, chip identifier 506, time 508, and confidence 510.

In another illustrative example, sensor system 108 may be omitted from object analysis system 102. In another illustrative example, target analysis system may be associated with a platform. For example, object analysis system 102 may be associated with a platform selected from one of a mobile platform, a stationary platform, a land-based structure, an aquatic-based structure, and a space-based structure. More specifically, the platform may be an aircraft, a surface ship, a tank, a personnel carrier, a train, a spacecraft, a space station, a satellite, a submarine, an automobile, a building, and other suitable platforms.

Figure 8:
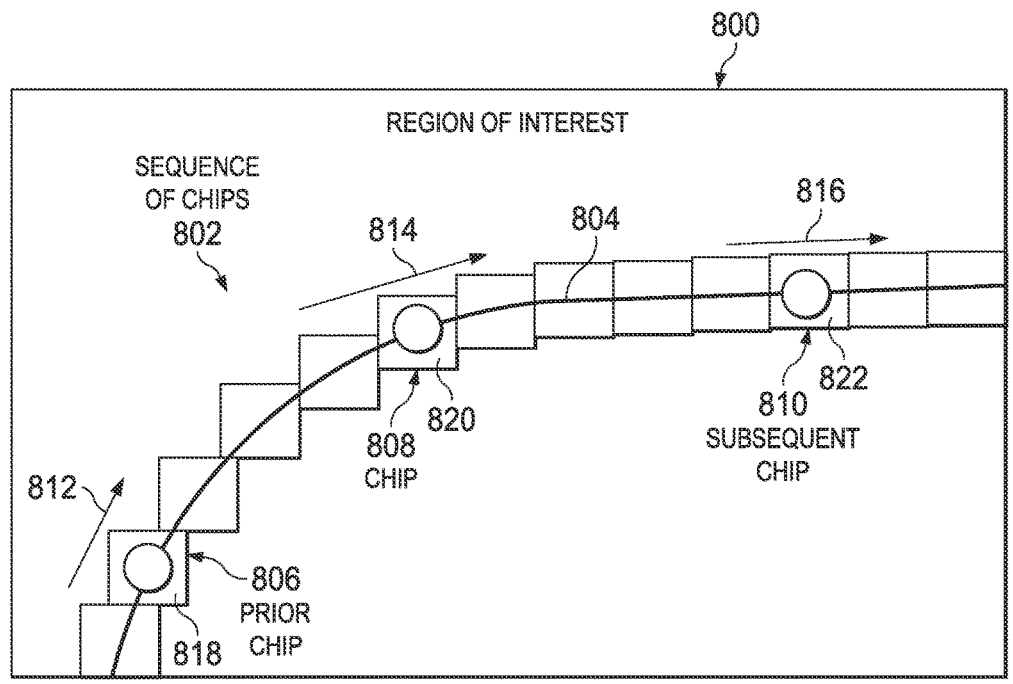
FIG. 8 is an illustration of a region of interest in accordance with an illustrative embodiment.

FIGS. 8-11 illustrate a region of interest that may be divided into chips. With reference now to FIG. 8, an illustration of a region of interest is depicted in accordance with an illustrative embodiment. In this illustrative example, region of interest 800 is an example of region of interest 120 in FIG. 1.

Sequence of chips 802 is an example of sequence of chips 316 in FIG. 3. Potential path 804 is an example of potential path 314 in FIG. 3. Potential path 804 is an indicator of a constraint region of interest 800.

For example, potential path 804 is a section of a road. In this illustrative example, objects are predicted to travel on this section. In this example, objects are not predicted to move off of this section of the road. In this illustrative example, sequence of chips 802 is the portion of chips in region of interest 800 on potential path 804.

Prior chip 806 is an example of prior chip 330, chip 808 is an example of chip 326, and subsequent chip 810 is an example of subsequent chip 332. In this illustrative example, velocity 812, velocity 814, and velocity 816 are examples of potential velocity 320. In the illustrative example, the speed for velocity 812 is the same for velocity 814 and velocity 816.

As depicted, pixels 818 within prior chip 806 are from a first frame for a first time, and pixels 820 within chip 808 are from a second frame for a second time. Pixels 822 within subsequent chip 810 are from a third frame for a third time. In this illustrative example, the first time may be referred to as a prior time, the second time may be referred to as a current time, and the third time may be referred to as a subsequent time.

In the illustrative example, pixels 818, pixels 820, and pixels 822 indicate that an object was located within prior chip 806 in the first frame, within chip 808 in the second frame, and within subsequent chip 810 in the third frame. In other words, these frames indicate that a particular object traveled at a particular speed on potential path 804.

Figure 9:
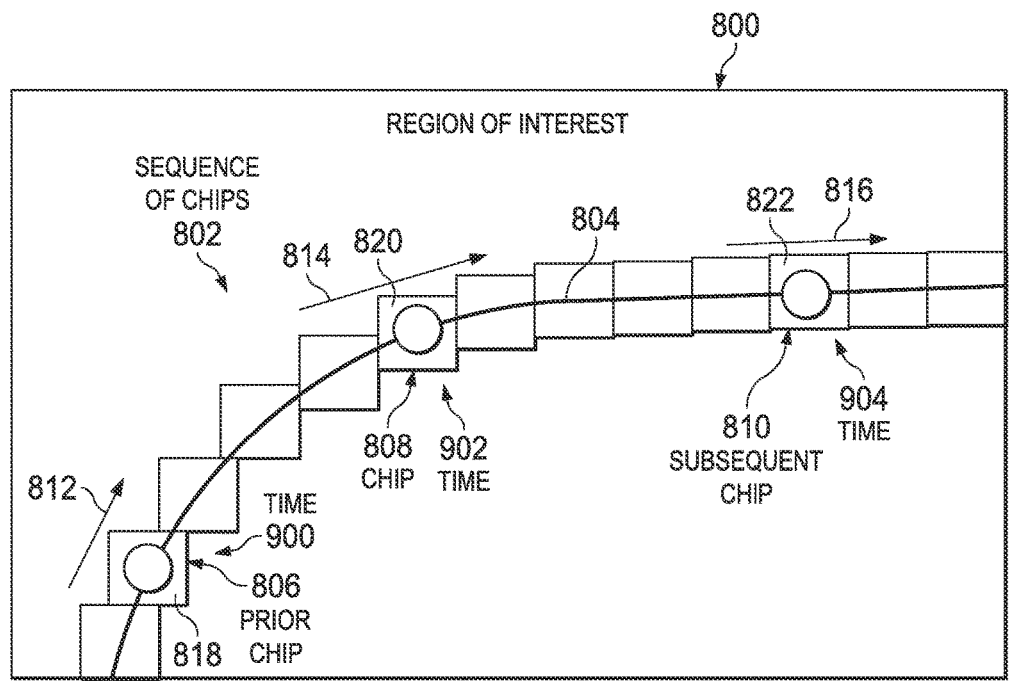
FIG. 9 is an illustration of a region of interest in accordance with an illustrative embodiment.

With reference next to FIG. 9, an illustration of a region of interest is depicted in accordance with an illustrative embodiment. As depicted, pixels 818 are generated by a sensor system at time 900. Pixels 820 are generated by a sensor system at time 902 and pixels 822 are generated by a sensor system at time 904. Time 902 may be referred to as a particular time.

In the illustrative example, pixels 818, pixels 820, and pixels 822 indicate that an object was located within prior chip 806 at time 900, within chip 808 at time 902, and within subsequent chip 810 at time 904.

Figure 10:
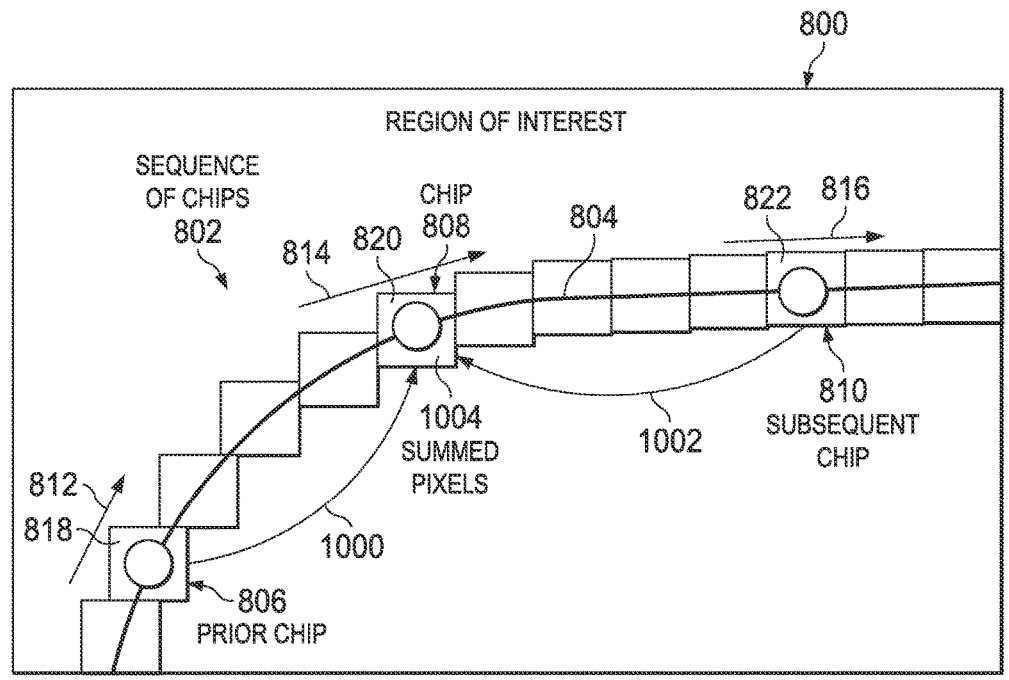
FIG. 10 is an illustration of a region of interest in accordance with an illustrative embodiment.

Turning now to FIG. 10, an illustration of a region of interest is depicted in accordance with an illustrative embodiment. As depicted, the direction of arrow 1000 and the direction of arrow 1002 indicate that a constrained velocity matched filter has summed values for pixels 818, values for pixels 820, and values for pixels 822 to form summed pixels 1004. In this illustrative example, the constrained velocity matched filter divides the values for summed pixels 1004 by three (3) to form average values for pixels for prior chip 806, chip 808, and subsequent chip 810.

Figure 11:
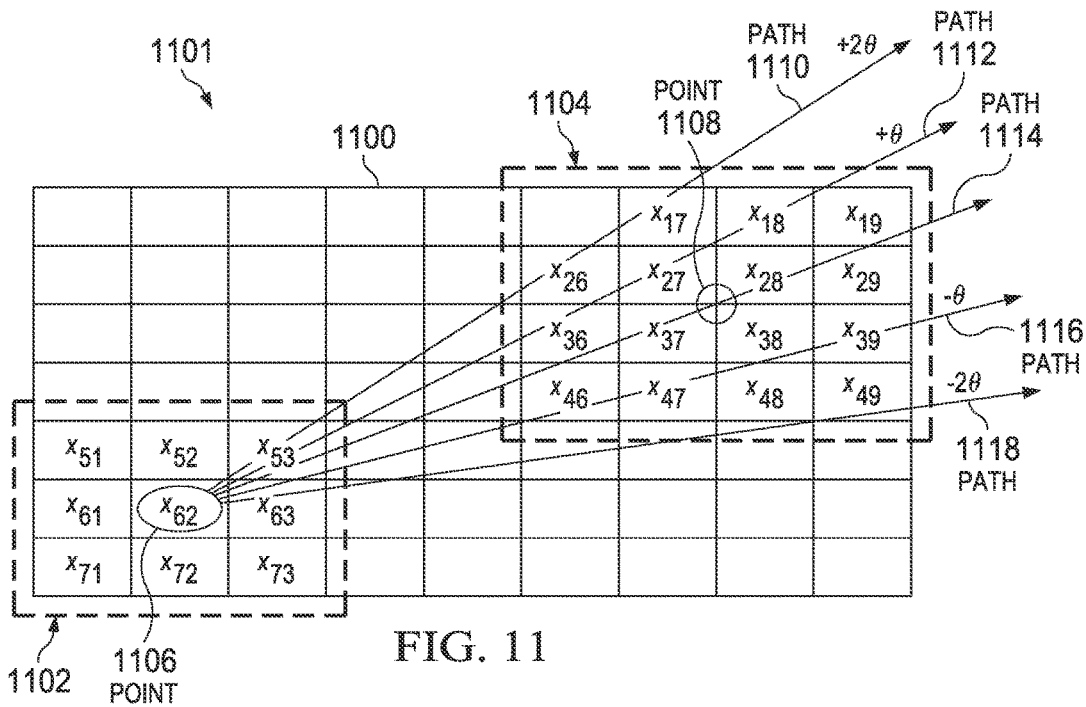
FIG. 11 is an illustration of chips for a region of interest in accordance with an illustrative embodiment.

Turning to FIG. 11, an illustration of chips for a region of interest is depicted in accordance with an illustrative embodiment. In this illustrative example, region of interest 1100 is divided into chips 1101. Region of interest 1100 is an example of region of interest 120 in FIG. 1. Chips 1101 are an example of sections 122 in FIG. 1.

As depicted, potential paths are identified by potential points 1102 and potential points 1104. These potential paths represent potential paths for a track. Potential points are points located around a predicted point. These potential paths may be predicted state vectors.

The points in the potential points are locations where an object may be detected. Point 1106 is an example of a point in potential points 1102 and point 1108 is an example of a point in potential points 1104. As depicted, the potential paths include path 1110, path 1112, path 1114, path 1116, and path 1118.

In this illustrative example, a dynamic constrained velocity matched filter identifies these potential paths. In this example, the dynamic constrained velocity matched filter uses a constrained velocity matched filter to detect objects traveling within a sequence of chips on these potential paths. For example, the dynamic constrained velocity matched filter may use the constrained velocity matched filter to reduce the number of potential paths in a track.

Figure 12:
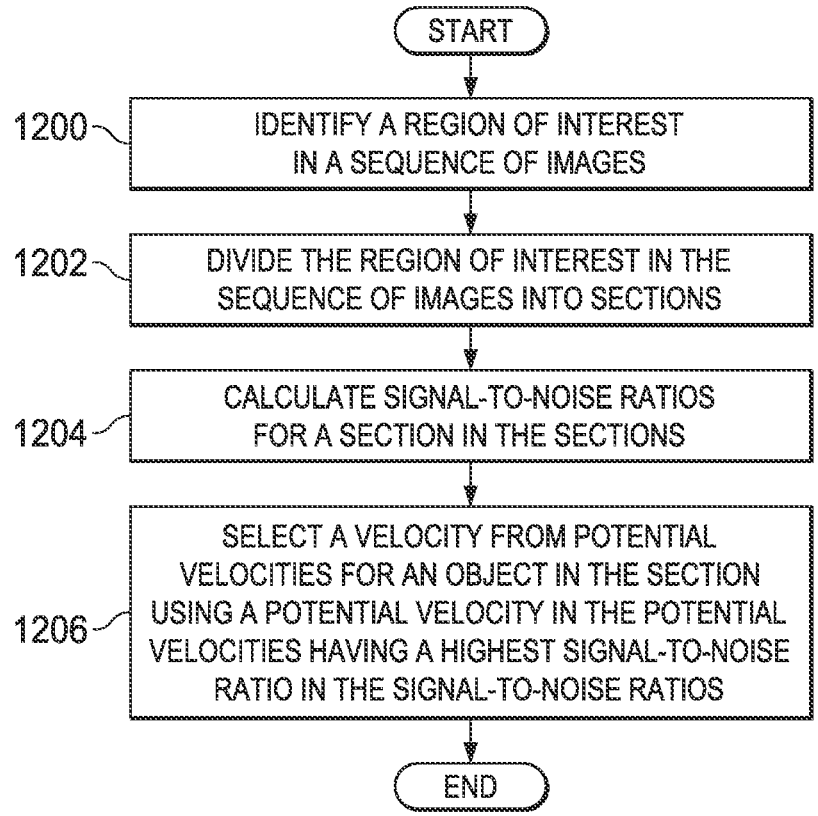
FIG. 12 is an illustration of a flowchart of a process for analyzing a sequence of images in accordance with an illustrative embodiment.

Turning next to FIG. 12, an illustration of a flowchart of a process for analyzing a sequence of images is depicted in accordance with an illustrative embodiment. The process illustrated in this figure may be implemented in object analysis system 102 in FIG. 1. In particular, the process may be implemented in image analyzer 110.

The process begins by identifying a region of interest in a sequence of images (step 1200). The object is likely to move within the region of interest. The process divides the region of interest in the sequence of images into sections (step 1202).

The process calculates signal-to-noise ratios for a section in the sections (step 1204). The signal-to-noise ratio for a section in the sections in an image in the sequence of images is calculated in step 1204 using the section in the image, a prior section in a prior image to the image in the sequence of images, and a subsequent section in a subsequent image to the image in the sequence of images. The signal-to-noise ratios are for potential velocities of the object in the section.

The process selects a velocity from potential velocities for an object in the section using a potential velocity in the potential velocities having a highest signal-to-noise ratio in the signal-to-noise ratios (step 1206), with the process terminating thereafter.

Figure 13:
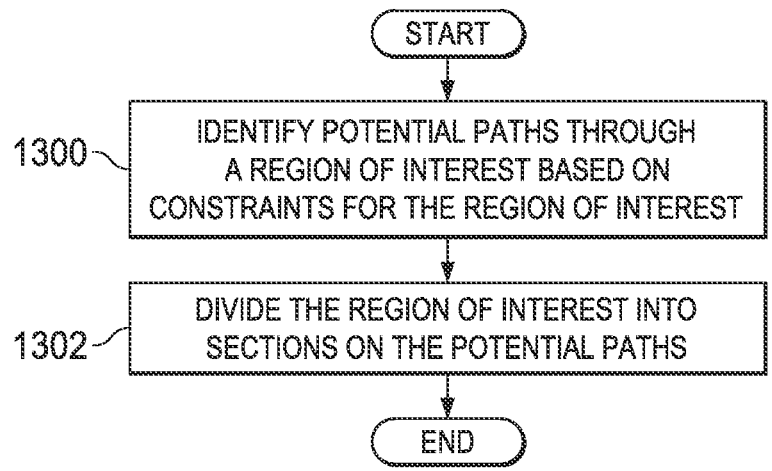
FIG. 13 is an illustration of a flowchart of a process for dividing a region of interest in a sequence of images into sections in accordance with an illustrative embodiment.

Turning to FIG. 13, an illustration of a flowchart of a process for dividing a region of interest in a sequence of images into sections is depicted in accordance with an illustrative embodiment. The process illustrated in this figure may be implemented in object analysis system 102 in FIG. 1. In particular, the process may be implemented in image analyzer 110. This process is an example of an implementation for step 1202 in FIG. 12.

The process begins by identifying potential paths through a region of interest based on constraints for the region of interest (step 1300). The process then divides the region of interest into sections on the potential paths (step 1302), with the process terminating thereafter.

Figure 14:
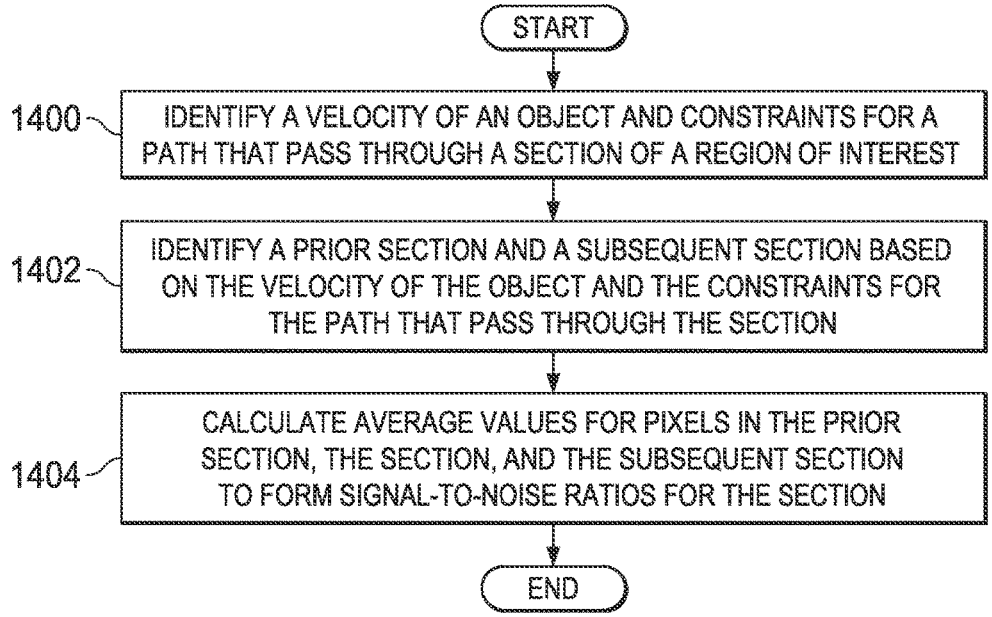
FIG. 14 is an illustration of a flowchart of a process for calculating signal-to-noise ratios in accordance with an illustrative embodiment.

With reference to FIG. 14, an illustration of a flowchart of a process for calculating signal-to-noise ratios is depicted in accordance with an illustrative embodiment. The process illustrated in this figure may be implemented in object analysis system 102 in FIG. 1. In particular, the process may be implemented in image analyzer 110. This process is an example of an implementation for step 1204 in FIG. 12.

The process begins by identifying a velocity of an object and constraints for a path that pass through a section of a region of interest (step 1400). The process identifies a prior section and a subsequent section based on the velocity of the object and the constraints for the path that pass through the section (step 1402). The process calculates average values for pixels in the prior section, the section, and the subsequent section to form signal-to-noise ratios for the section (step 1404), with the process terminating thereafter.

Figure 15:
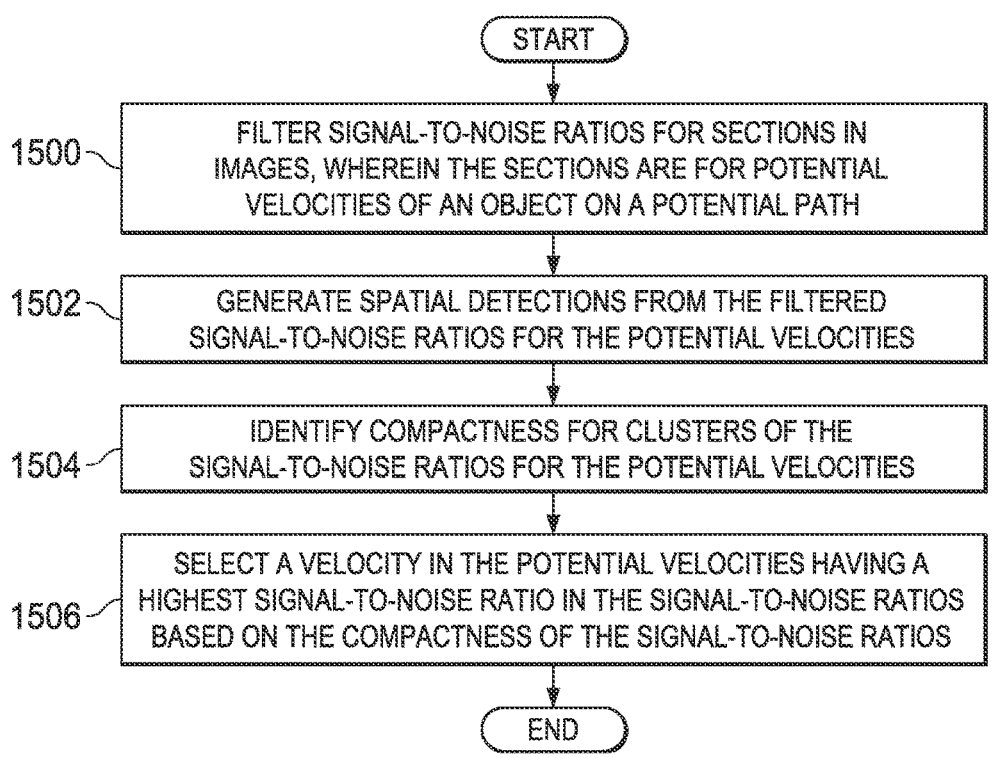
FIG. 15 is an illustration of a flowchart of a process for selecting a velocity from potential velocities for an object in accordance with an illustrative embodiment.

With reference to FIG. 15, an illustration of a flowchart of a process for selecting a velocity from potential velocities for an object is depicted in accordance with an illustrative embodiment. The process illustrated in this figure may be implemented in object analysis system 102 in FIG. 1. In particular, the process may be implemented in image analyzer 110. This process is an example of an implementation for step 1206 in FIG. 12.

The process begins by filtering signal-to-noise ratios for sections in images, wherein the sections are for potential velocities of an object on a potential path (step 1500). In this example, the filter is a spatial matched filter.

The process generates spatial detections from the filtered signal-to-noise ratios for the potential velocities (step 1502). The process identifies compactness for clusters of the signal-to-noise ratios for the potential velocities (step 1504). In this example, the compactness for the clusters of the signal-to-noise ratios for the potential velocities may be identified using a spatial clustering filter.

The process then selects a velocity in the potential velocities having a highest signal-to-noise ratio in the signal-to-noise ratios based on the compactness of the signal-to-noise ratios (step 1506), with the process terminating thereafter.

Figure 16:
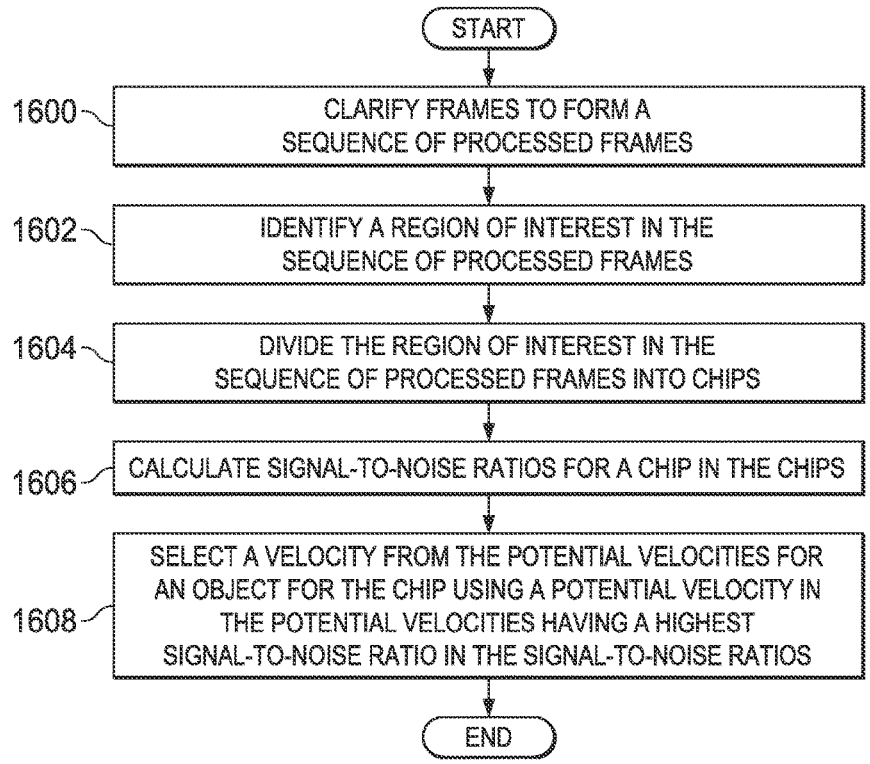
FIG. 16 is an illustration of a flowchart of a process for analyzing a sequence of images in accordance with an illustrative embodiment.

Turning next to FIG. 16, an illustration of a flowchart of a process for analyzing a sequence of images is depicted in accordance with an illustrative embodiment. The process illustrated in this figure may be implemented in object analysis system 102 in FIG. 1. In particular, the process may be implemented in image analyzer 110.

The process begins by clarifying frames to form a sequence of processed frames (step 1600). Clarifying frames includes at least one of generating foreground frames with a background suppressor, generating whitened frames with a whitener, or generating processed frames with a spatial matched filter. The process next identifies a region of interest in the sequence of processed frames (step 1602). The process divides the region of interest in the sequence of processed frames into chips (step 1604).

The process calculates signal-to-noise ratios for a chip in the chips (step 1606). The signal-to-noise ratio for a chip in the chips in a frame in the sequence of frames is calculated in step 1606 using the chip in the frame, a prior chip in a prior frame to the chip in the sequence of chips, and a subsequent chip in a subsequent frame to the frame in the sequence of frames. The signal-to-noise ratios are for potential velocities for the object.

The process selects a velocity from the potential velocities for an object for the chip using a potential velocity in the potential velocities having a highest signal-to-noise ratio in the signal-to-noise ratios (step 1608), with the process terminating thereafter.

Figure 17:
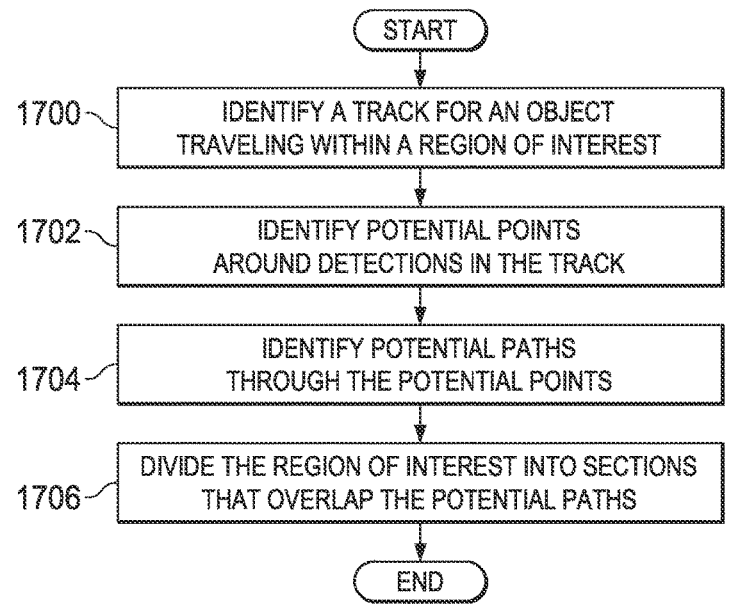
FIG. 17 is an illustration of a flowchart of a process for dividing a region of interest in a sequence of images into sections in accordance with an illustrative embodiment.

Turning to FIG. 17, an illustration of a flowchart of a process for dividing a region of interest in a sequence of images into sections is depicted in accordance with an illustrative embodiment. The process illustrated in this figure may be implemented in object analysis system 102 in FIG. 1. In particular, the process may be implemented in detector 206 in FIG. 2. This process is an example of an implementation for step 1202 in FIG. 12.

The process begins by identifying a track for an object traveling within a region of interest (step 1700). The process identifies potential points around detections in the track (step 1702). The process identifies potential paths through the potential points (step 1704). The process then divides the region of interest into sections that overlap the potential paths (step 1706), with the process terminating thereafter.

Figure 18:
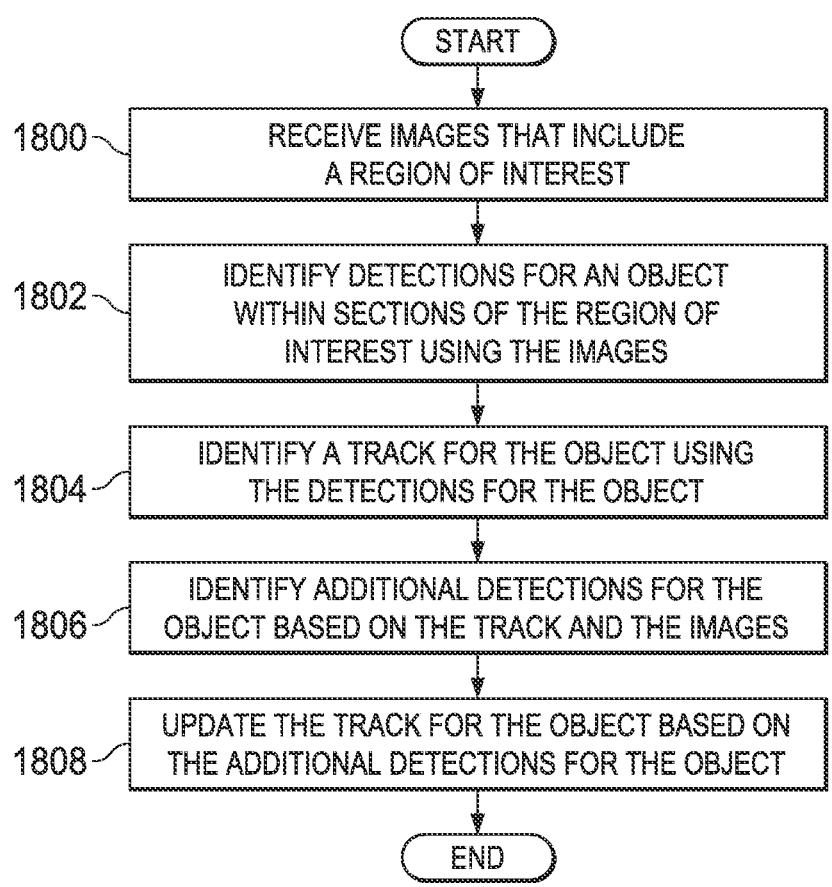
FIG. 18 is an illustration of a flowchart of a process for analyzing a sequence of images in accordance with an illustrative embodiment.

With reference now to FIG. 18, an illustration of a flowchart of a process for analyzing a sequence of images is depicted in accordance with an illustrative embodiment. The process illustrated in this figure may be implemented in object analysis system 102 in FIG. 1. In particular, the process may be implemented in image analyzer 110 in FIG. 2.

The process begins by receiving images that include a region of interest (step 1800). The process identifies detections for an object within sections of the region of interest using the images (step 1802). The process may identify the detections for the object using a constrained velocity matched filter on the sections of the region of interest in the images.

The process identifies a track for the object using the detections for the object (step 1804). The process identifies additional detections for the object based on the track and the images (step 1806). The process may identify the additional detections for the object using a dynamic constrained velocity matched filter on the sections of the region of interest in the images. The process then updates the track for the object based on the additional detections for the object (step 1808), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 19:
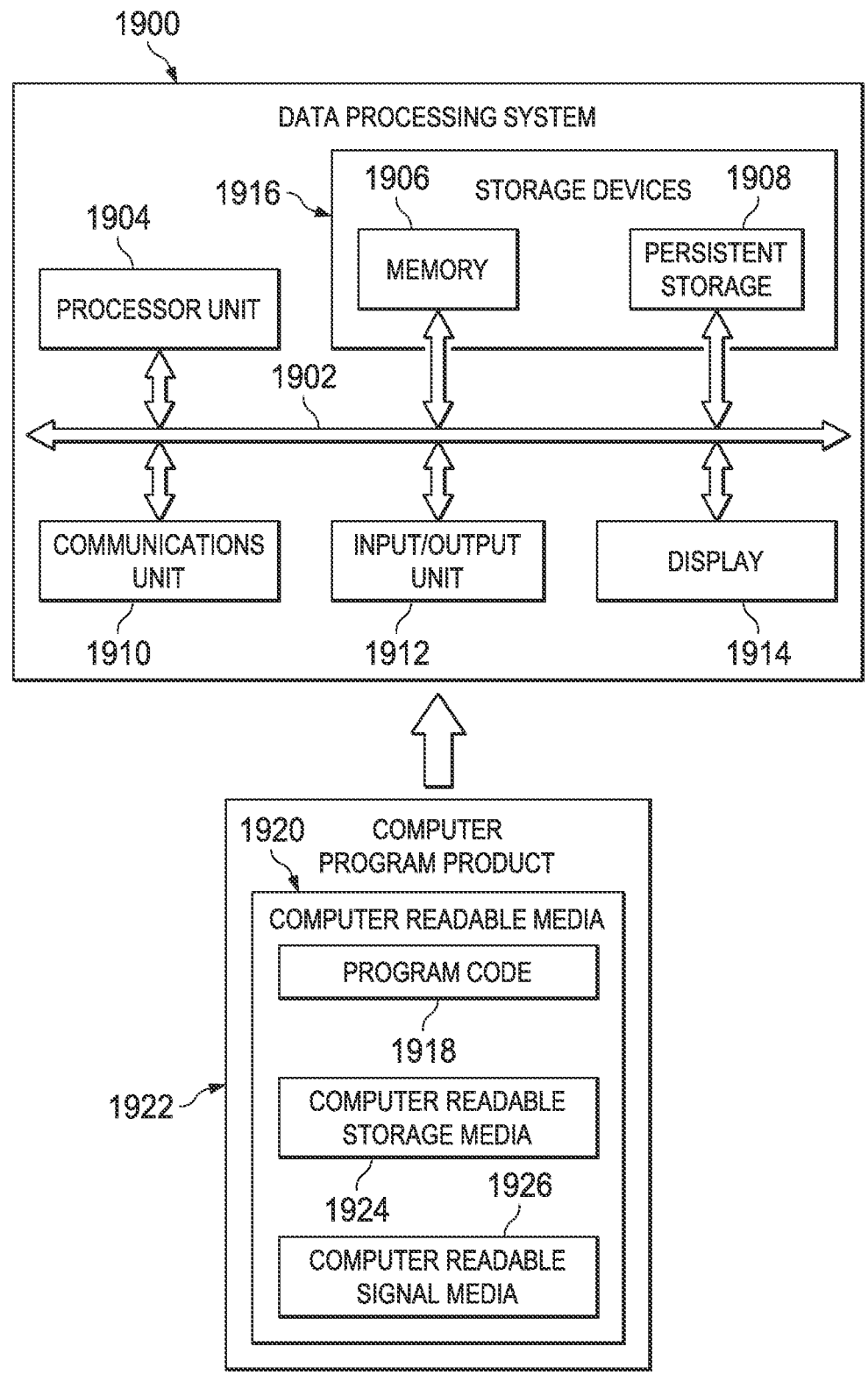
FIG. 19 is an illustration of a block diagram of a data processing system in accordance with an illustrative embodiment.

Turning now to FIG. 19, an illustration of a block diagram of a data processing system is depicted in accordance with an illustrative embodiment. Data processing system 1900 may be used to implement computer system 114 in FIG. 1. In this illustrative example, data processing system 1900 includes communications framework 1902, which provides communications between processor unit 1904, memory 1906, persistent storage 1908, communications unit 1910, input/output (I/O) unit 1912, and display 1914. In this example, communication framework may take the form of a bus system.

Processor unit 1904 serves to execute instructions for software that may be loaded into memory 1906. Processor unit 1904 may be a number of processors, a multi-processor core, a graphics processing unit, or some other type of processor, depending on the particular implementation.

Memory 1906 and persistent storage 1908 are examples of storage devices 1916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1916 may also be referred to as computer readable storage devices in these illustrative examples. Memory 1906, in these examples, may be, for example, a random access memory or any other suitable volatile or non-volatile storage device. Persistent storage 1908 may take various forms, depending on the particular implementation.

For example, persistent storage 1908 may contain one or more components or devices. For example, persistent storage 1908 may be a hard drive, a flash memory, a rewritable optical disk, a rewritable magnetic tape, or some combination of the above. The media used by persistent storage 1908 also may be removable. For example, a removable hard drive may be used for persistent storage 1908.

Communications unit 1910, in these illustrative examples, provides for communications with other data processing systems or devices. In these illustrative examples, communications unit 1910 is a network interface card.

Input/output unit 1912 allows for input and output of data with other devices that may be connected to data processing system 1900. For example, input/output unit 1912 may provide a connection for user input through at least of a keyboard, a mouse, or some other suitable input device. Further, input/output unit 1912 may send output to a printer. Display 1914 provides a mechanism to display information to a user.

Instructions for at least one of the operating system, applications, or programs may be located in storage devices 1916, which are in communication with processor unit 1904 through communications framework 1902. The processes of the different embodiments may be performed by processor unit 1904 using computer-implemented instructions, which may be located in a memory, such as memory 1906.

These instructions are referred to as program code, computer usable program code, or computer readable program code that may be read and executed by a processor in processor unit 1904. The program code in the different embodiments may be embodied on different physical or computer readable storage media, such as memory 1906 or persistent storage 1908.

Program code 1918 is located in a functional form on computer readable media 1920 that is selectively removable and may be loaded onto or transferred to data processing system 1900 for execution by processor unit 1904. Program code 1918 and computer readable media 1920 form computer program product 1922 in these illustrative examples. In one example, computer readable media 1920 may be computer readable storage media 1924 or computer readable signal media 1926.

In these illustrative examples, computer readable storage media 1924 is a physical or tangible storage device used to store program code 1918 rather than a medium that propagates or transmits program code 1918.

Alternatively, program code 1918 may be transferred to data processing system 1900 using computer readable signal media 1926. Computer readable signal media 1926 may be, for example, a propagated data signal containing program code 1918. For example, computer readable signal media 1926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1900 are not meant to provide architectural limitations to the manner in which different embodiments may be implemented. The different illustrative embodiments may be implemented in a data processing system including components in addition to or in place of those illustrated for data processing system 1900. Other components shown in FIG. 19 can be varied from the illustrative examples shown. The different embodiments may be implemented using any hardware device or system capable of running program code 1918.

In this manner, one or more of the illustrative embodiments provide a method and apparatus for analyzing a sequence of images for an object. The image analyzer in the illustrative examples allows for faster detection of objects. In particular, with the image analyzer, real-time or near real-time analysis of images may be made. For example, with this situation, automatically detecting objects in real-time that are barely visible to the human eye and with the object signal closer to the noise floor may make detecting objects more difficult than desired. With these detections, actions may be taken. For example, actions may include additional analysis of images, alerts, tracking objects, identifying objects, and other actions.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described.

For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for analyzing a sequence of images of an object, the method comprising:
   identifying a region of interest in the sequence of images, wherein the object is likely to move within the region of interest;
   dividing the region of interest in the sequence of images into sections;
   calculating signal-to-noise ratios for a section in the sections, wherein a signal-to-noise ratio for the section in the sections in an image in the sequence of images is calculated using the section in the image, a prior section in a prior image to the image in the sequence of images, and a subsequent section in a subsequent image to the image in the sequence of images and wherein the signal-to-noise ratios are for potential velocities of the object in the section; and
   selecting a velocity from the potential velocities for the object in the section using a potential velocity in the potential velocities having a highest signal-to-noise ratio in the signal-to-noise ratios.

2. The method of claim 1, wherein the calculating step comprises:
   summing the section in the image, the prior section in the prior image, and the subsequent section in the subsequent image to form a summed section; and
   identifying the signal-to-noise ratios using an average of values of the summed section.

3. The method of claim 1 further comprising:
   identifying a number of portions of the sequence of images as not of interest to form a background in the sequence of images; and
   removing the background from the images.

4. The method of claim 1 further comprising:
   reducing variations in pixels in the sequence of images, wherein noise in the image is reduced.

5. The method of claim 1 further comprising:
   calculating the signal-to-noise ratios using spatial matched filters, wherein each spatial matched filter corresponds to the potential velocity in the potential velocities.

6. The method of claim 1 further comprising:
   identifying an area in which the object is likely to travel.

7. The method of claim 1, wherein the region of interest is a constrained region.

8. The method of claim 1, wherein the sections are chips.

9. The method of claim 1, wherein the image is generated by a sensor system at a particular time, the prior image is generated by the sensor system at a time prior to the particular time, the subsequent image is generated by the sensor system at a subsequent time to the particular time and further comprising:
   identifying the prior section in the prior image based on a prediction of where the object would be at the prior time; and
   identifying the subsequent section in the subsequent image based on a prediction of where the object would be at the subsequent time.

10. An apparatus comprising:
    an image analyzer that identifies a region of interest in a sequence of images, wherein an object is likely to move within the region of interest; divides the region of interest in the sequence of images into sections and calculates signal-to-noise ratios for a section in the sections, wherein a signal-to-noise ratio for the section in the sections in an image in the sequence of images is calculated using the section in the image, a prior section in a prior image to the image in the sequence of images, and a subsequent section in a subsequent image to the image in the sequence of images and wherein the signal-to-noise ratios are for potential velocities of the object in the section; and selects a velocity from the potential velocities for the object in the section using a potential velocity in the potential velocities having a highest signal-to-noise ratio in the signal-to-noise ratios.

11. The apparatus of claim 10, wherein in calculating the signal-to-noise ratios, the image analyzer sums the section in the image, the prior section in the prior image, and the subsequent section in the subsequent image to form a summed section; and identifies the signal-to-noise ratios using an average of values of the summed section.

12. The apparatus of claim 10, wherein the image analyzer identifies a number of portions of the sequence of images as not of interest to form a background in the sequence of images; and removes the background from the images.

13. The apparatus of claim 10, wherein the image analyzer reduces variations in pixels in the sequence of images such that noise in the image is reduced.

14. The apparatus of claim 10, wherein the image analyzer calculates the signal-to-noise ratios using constrained spatial matched filters, wherein each constrained spatial matched filter corresponds to the potential velocity in the potential velocities.

15. The apparatus of claim 10, wherein the image analyzer identifies an area in which the object is likely to travel.

16. The apparatus of claim 10, wherein the region of interest is a constrained region.

17. The apparatus of claim 10, wherein the sections are chips.

18. A detection system comprising:
    a first detector that receives images that include a region of interest, wherein the first detector identifies detections for an object within sections of the region of interest using the images and calculates signal-to-noise ratios for a section in the sections, wherein a signal-to-noise ratio for the section in the sections in an image in a sequence of images is calculated using the section in the image, a prior section in a prior image to the image in the sequence of images, and a subsequent section in a subsequent image to the image in the sequence of images and wherein the signal-to-noise ratios are for potential velocities of the object in the section; and selects a velocity from the potential velocities for the object in the section using a potential velocity in the potential velocities having a highest signal-to-noise ratio in the signal-to-noise ratios, wherein the velocity selected forms a detection in the detections;

a tracker in communication with the first detector, wherein the tracker identifies a track for the object using the detections for the object; and a second detector in communication with the tracker, wherein the second detector identifies additional detections for the object based on the track and the images.

19. The detection system of claim 18, wherein the tracker updates the track for the object based on the additional detections for the object.

20. The detection system of claim 18, wherein the first detector includes a constrained velocity matched filter and the second detector includes a dynamic constrained velocity matched filter.

* * * * *